United States Patent [19]

Kerber

[11] Patent Number: 5,184,775
[45] Date of Patent: Feb. 9, 1993

[54] FIELD CROP SPRAYER

[76] Inventor: Philip S. Kerber, Rte. 2, Box 36, Baudette, Minn. 56623

[21] Appl. No.: 687,839

[22] Filed: Apr. 19, 1991

[51] Int. Cl.⁵ ............................................. A01C 23/04
[52] U.S. Cl. .................................... 239/163; 239/172; 239/601
[58] Field of Search ......................... 239/159, 163–170, 239/172, 175, 550, 556, 601

[56] References Cited

U.S. PATENT DOCUMENTS

| | | | |
|---|---|---|---|
| 1,883,479 | 10/1932 | Bateman et al. | 239/168 |
| 1,886,369 | 11/1932 | Bogart | 239/166 |
| 3,127,109 | 3/1964 | Frase. | |
| 3,191,871 | 6/1965 | Palmer | 239/601 |
| 3,351,287 | 11/1967 | Funk et al. | |
| 3,353,748 | 11/1967 | Harris. | |
| 3,390,835 | 7/1968 | Harris. | |
| 3,409,221 | 11/1968 | Patterson. | |
| 3,447,750 | 6/1969 | Weston. | |
| 3,550,854 | 12/1970 | Fischer. | |
| 3,648,930 | 3/1972 | Brown et al. | |
| 3,730,431 | 5/1973 | Williams. | |
| 3,831,848 | 8/1974 | Cook. | |
| 3,998,387 | 12/1976 | Maasberg. | |
| 4,007,793 | 2/1977 | Hux et al. | |
| 4,052,006 | 10/1977 | Grass. | |
| 4,199,896 | 4/1980 | Lehman. | |
| 4,427,154 | 1/1984 | Mercil. | |
| 4,481,894 | 11/1984 | Brenn | 239/163 |
| 4,527,739 | 7/1985 | Parma et al. | |
| 4,629,123 | 12/1986 | Gorder. | |
| 4,736,818 | 4/1988 | Wolfe. | |
| 4,736,888 | 4/1988 | Fasnacht. | |
| 4,739,930 | 4/1988 | Pask. | |
| 4,768,715 | 9/1988 | Sali et al. | |

OTHER PUBLICATIONS

Delavan Agspray Products 1987 Catalog #1609L, pp. 22–25.

Primary Examiner—Andres Kashnikow
Assistant Examiner—Karen B. Merritt
Attorney, Agent, or Firm—Vidas & Arrett

[57] ABSTRACT

A field crop sprayer assembly which is comprised of a main boom and a trailing boom. The main boom carries flat fan tip nozzles while the trailing boom carried round tip nozzles. The individual nozzles on each boom are spaced a predetermined distance apart. The arrangement provides for better and more uniform coverage of a field and a reduction in the amount of spray substance used.

8 Claims, 2 Drawing Sheets

FIELD CROP SPRAYER

BACKGROUND OF THE INVENTION

1. Field Of The Invention

This invention relates to field crop sprayers, and more particularly to a field crop sprayer assembly utilizing a main boom and trailing boom.

2. Description Of The Related Art

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

U.S. Pat. No. 3,127,109, entitled "Mobile Dual Oval Pattern Fertillizer Distributor", issued Mar. 31, 1964 to R. J. Frase, is directed to a device which sprays in a certain pattern, but which does not use nozzles staggered in two rows. Therefore, this reference is not considered anticipatory or suggestive of the invention.

U.S. Pat. No. 3,353,748, entitled "Vibrating Distributor Bar For Agricultural Chemicals", issued Nov. 21, 1967 to D. A. Harris, is directed to a sprinkling apparatus which causes larger droplets to form, thereby preventing drift. This reference is not considered anticipatory or suggestive of the invention.

U.S. Pat. No. 3,390,835, entitled "Process Of Jiggling Liquid Into Discrete Droplets", issued Jul. 2, 1968 to D. A. Harris, is directed to a different method than the reference directly above, of creating larger droplets to prevent drift. This reference is not considered anticipatory or suggestive of the invention.

U.S. Pat. No. 3,447,750, entitled "Spraying Booms", issued Jun. 3, 1969 to H. W. Weston, is directed to a spray boom which can pivot about a center point to keep the boom horizontal to the ground. The boom is also provided with shock absorbers to control and damp swing of the boom as a result of a portion of the boom striking the ground. The spray nozzles are not staggered in two rows. Therefore, this reference is not considered anticipatory or suggestive of the invention.

U.S. Pat. No. 3,550,854, entitled "Ultra-Low Volume Spraying Apparatus And Systems For Insecticides And The Like", issued Dec. 29, 1970 to Harry Fischer, is directed to spraying apparatus which utilizes one row of nozzles. This device does not use two different types of nozzles, which are arranged into two rows to provide a better spray pattern. Therefore, this reference is not considered anticipatory or suggestive of the invention.

U.S. Pat. No. 3,648,930, entitled "Chemical Solution Spray System For Self-Propelled Sprinkling Apparatus", issued Mar. 14, 1972 to Perry Brown, is directed to a spray system using oscillating spray arms. This reference is not considered anticipatory or suggestive of the invention.

U.S. Pat. No. 3,831,848, entitled "Spray Bar With Guide Wheels And Stabilizing Poles", issued Aug. 27, 1974 to Henry Cook, is directed to a spray bar used along the side of a building. This reference is not considered anticipatory or suggestive of the invention.

U.S. Pat. No. 4,052,006, entitled "Folding Spray Boom", issued Oct. 4, 1977 to Henry Grass, is directed to a spray boom which can fold up. The boom is provided with one row of nozzles only. Therefore, this reference is not considered anticipatory or suggestive of the invention.

U.S. Pat. No. 4,199,896, entitled "Controlled Area Boom Sprayer", issued Apr. 29, 1980 to Verne Lehman, is directed to a boom sprayer utilizes a bell shaped hood to direct the spray downward so as not to spray the bush or tree directly. The hood is rotatable so that as the hood contacts foliage it is guided around it, spraying the ground, and not spraying the foliage. This reference is not considered anticipatory or suggestive of the invention.

U.S. Pat. No. 4,427,154, entitled "Boom Suspension And Lift Assembly", issued Jan. 24, 1984 to LeRoy Mercil, is directed to a boom which utilizes a suspension system to absorb boom motion caused by uneven terrain. The boom uses only one row of nozzles. Therefore, this reference is not considered anticipatory or suggestive of the invention.

U.S. Pat. No. 4,629,123, entitled "Crop Sprayer", issued Dec. 16, 1986 to Norman Gorder, is directed to a sprayer which bends the crops downwardly to provide more complete coverage by the sprayer. Only one row of nozzles is used. Therefore, this reference is not considered anticipatory or suggestive of the invention.

U.S. Pat. No. 4,736,888, entitled "Row Crop Band Sprayer", issued Apr. 12, 1988 to Kenneth Fasnacht, is directed to a sprayer which uses a pair of nozzles attached to cross pieces which form an upside down V. The nozzles are angled with respect to the ground. The assembly may pivot to keep the nozzles level on uneven ground. The nozzles may also be flat or fan type. However, this device does not arrange the nozzles into two rows, with nozzles of one type in one row, and nozzles of a second type in the other row. Instead, all nozzles are in a single row with individual nozzles angled toward one another. Therefore, this reference is not considered anticipatory or suggestive of the invention.

U.S. Pat. No. 4,739,930, entitled "Agricultural Field Sprayer", issued Apr. 26, 1988 to Glen Pask, is directed to a sprayer which utilizes nozzles which are arranged into one row. This reference is not considered anticipatory or suggestive of the invention.

U.S. Pat. No. 4,768,715, entitled "Vehicle Mountable Liquid Spray System", issued Sep. 6, 1988 to Brain Sali, is directed to a spray system designed to spray around tree trunks. This reference is not considered anticipatory or suggestive of the invention.

None of the above mentioned references provide adequate solutions to the problems of boom whip, boom jump, boom dip, and umbrella, larger weed, or crop canopy obstruction.

SUMMARY OF THE INVENTION

The subject invention solves the problems discussed above with a field crop sprayer assembly comprised of a main spray boom and a trailing boom, each provided with a row of spray nozzles. The row of nozzles on the main boom are flat fan tips and are spaced approximately 30 inches apart. The row of nozzles on the trailing boom (trails by approximately 2 feet) are round pattern nozzle and are spaced approximately 40 inches apart. The advantage of this arrangement is better and more uniform coverage of the field with a resultant reduction of chemical usage by $\frac{1}{4}$ to $\frac{1}{3}$. This arrangement also compensates for the effects of boom whip, boom jump and dip, and obstructions. The invention is also easy to manufacture since it uses standard components throughout, and is simple to install on existing rigs. It is also easy to maintain because there are no moving parts or wear points.

DESCRIPTION OF THE PREFERRED EMBODIMENTS

Figure 1:
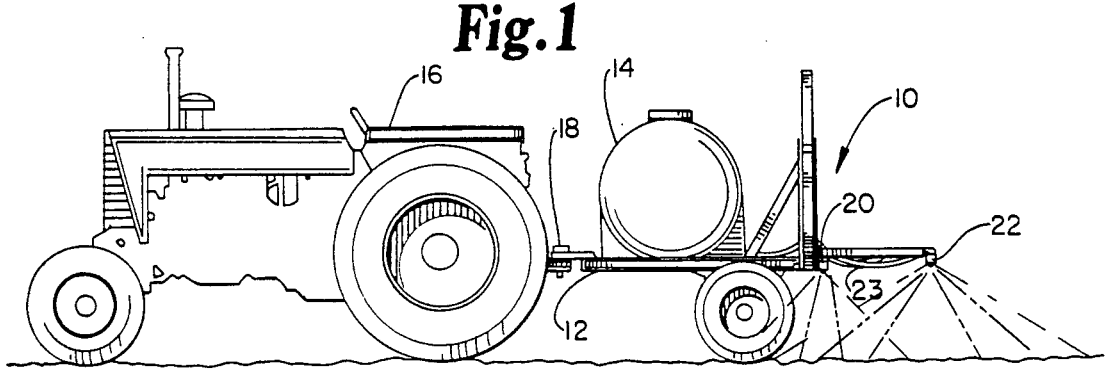
FIG. 1 is a left side elevational view of the invention together with a tractor, with spray patterns in phantom line.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIG. 1, the field crop sprayer assembly, shown generally at 10 is attached to trailer 12. Trailer 12 carries the substance to be sprayed, usually herbicide, in the reservoir 14. Other chemical substances such as fertilizers or insecticides or the like may be carried and sprayed by the invention. Trailer 12 is connected to a tractor 16 by means of hitch 18. The field crop sprayer assembly 10 is made up of main boom 20 and a trailing boom which is made up of a plurality of nozzle support members 22, each between 20 and 24 inches long. Flexible plastic tubing 23 carries the fluid to be sprayed to each nozzle on the main and trailing boom.

Figure 2:
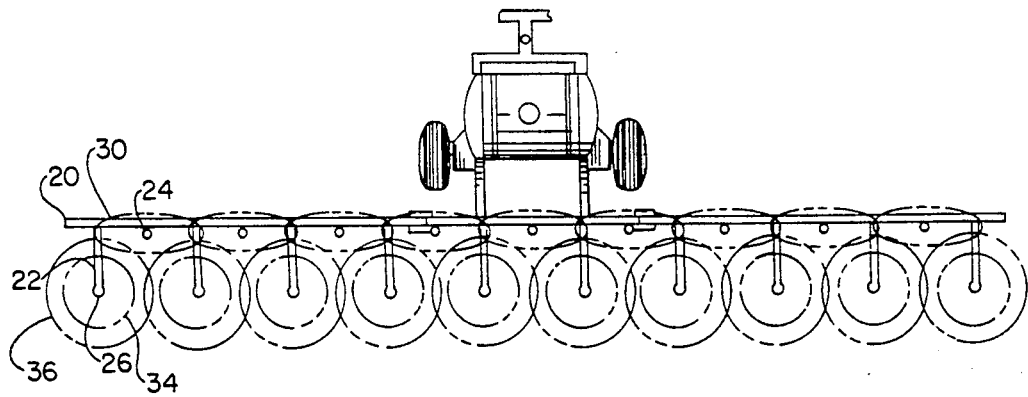
FIG. 2 is a top plan view of the invention showing spray patterns in phantom line.

Referring now to FIG. 2, a top view of the field crop sprayer assembly 10 is shown. The main boom 20 supports a plurality of nozzles 24. In the preferred embodiment, nozzles 24 are Delavan 80° LF flat fan spray nozzle tips which are spaced 30 inches apart along the main boom 20. The flat fan spray nozzles 24 provide an oval shaped spray pattern. The main boom 20 is positioned approximately 27 inches above the ground in the preferred embodiment.

The trailing boom, which consists of a plurality of nozzle supports 22, between 20 and 24 inches in length in the preferred embodiment, carries a second type of nozzle tip 26, which is supported at the end of each nozzle support 22. In the preferred embodiment this second type of nozzle is a ¼ inch Delavan WRW World Whirl-Rain ® nozzle, which is a wide angle (120°) hollow cone nozzle. The WRW nozzles provide a circular spray pattern.

The use of the trailing boom, the different types of nozzle tips and the spacing of the nozzle tips allows the subject invention to spray the same amount of crop or ground, while using between ¼ and ⅓ less chemical, and still obtain the same level of weed and/or insect pest control. The benefits of the subject invention are that it is cheaper, since less chemical is used, and there is less actual chemical applied to the crops which benefits the food and the environment. Typical coverage for the subject invention is 15 gallons per acre spray volume (GPA). This coverage is dependent on the pressure of the spray fluid, the speed at which the trailer moves, and the spacing of the nozzle tips.

In the preferred embodiment, the trailer is pulled at approximately 5 m.p.h. while the fluid pressure is 30 PSIG. At this speed and pressure the Delavan flat fan nozzle applies 10.3 GPA and the Delavan WRW nozzle applies 5.1 GPA.

This theoretical coverage is for smooth level surfaces. In actual use, field crop sprayers encounter uneven ground, sloped ground and obstacles such as fence posts, trees, etc. The four most common problems are discussed below.

1) Boom Whip—Most field crop spray assemblies are equipped with a spring device to allow the end portions of the boom to pivot to clear obstruction such as fence posts, trees, etc. In addition, the booms themselves tend to whip back and forth in the horizontal plane direction. At either end of the path traveled during the boom whip, excess chemical over and above the desired concentration is deposited on the ground. During the middle portion of the boom whip, when the boom is moving much faster than the 5 m.p.h. of the tractor, much less than the desired amount of chemical is deposited on the ground.

The subject invention overcomes this problem with the use of the trailing boom 22. The subject invention usually provides three spray passes over a single point of ground. The first pass is made by the main boom nozzle 24, which provides a fairly flat oval shaped spray pattern. The second pass is made with the leading edge of the circular spray pattern of nozzle 26 on the trailing boom. The third pass is made by the trailing edge of the circular spray pattern of nozzle 26. During the ends of boom whip, nozzle 24 oversprays these areas because the boom is moving slowly, while these same areas are typically covered by the trailing boom nozzle 26 when it is moving at high speed, thereby depositing a minimum of chemical. On the other hand, if the main boom nozzle 24 covers a point moving at too fast a speed, then the trailing boom nozzle 26 will deposit more chemical during its slower traverse over the same area. Thus, uniform coverage of the ground is provided during periods when the boom is traveling normally, as well as during periods of boom whip. 2) Boom Jump and Boom Dip—Bumps, depressions and uneven ground cause boom jump and boom dip, which consists of the ends of the boom dipping toward the ground, or jumping much higher than their nominal height of 27 inches, or oscillating in a vertical plane.

The subject invention compensates for this because if two little chemical is deposited due to the boom jumping upward as the main boom nozzle 24 passes over a point, then the rapidly following downward jump causes the trailing boom nozzle 26 to deposit a compensating overspray of chemical at that point. Conversely, during boom dip, the wide coverage of the 120° trailing boom nozzle 26 allows a relatively wide spray pattern when the boom is lower to the ground during boom dip. The staggered spacing of the main boom nozzles 24 being 30 inches apart, and the trailing boom nozzles being 40 inches apart causes the nozzles to follow a different centerline during boom dip and jump, which allows the spray patterns of the different nozzles to complement each other.

3) Obstacles and Canopy—Many prior art field crop sprayers utilize fairly flat fan tip nozzles which spray material nearly vertically downward. This can result in smaller weeds being sheltered from the spray by being hidden in the shadow of a dirt clod, or beneath the canopy of the crop or a larger weed.

By utilizing two rows of spray nozzles, with the first main nozzle tip 24 being an 80° flat fan provides coverage from above, with some coverage to the left and right. The trailing boom nozzle 26 sprays in all 360° at a more advantageous angle, thereby providing better coverage of hidden weeds.

It should be understood that many modifications to the preferred embodiment set forth are contemplated. While testing has empirically demonstrated that the preferred embodiment provides the most uniform coverage of a typical field, it is contemplated that the nozzle tips on both the main and trailing booms could be spaced at other intervals. Also the trailing boom nozzles could be placed either closer to or further from the main boom nozzles. The WRW nozzles 26 could precede the flat fan nozzles 24 rather than follow them. In addition, nozzles 24 and 26 could be provided with other spray angles. One of the critical features of the invention lays in combining two different types of nozzles, with one type being on the main boom, and the second type being on a trailing boom.

Figure 3:
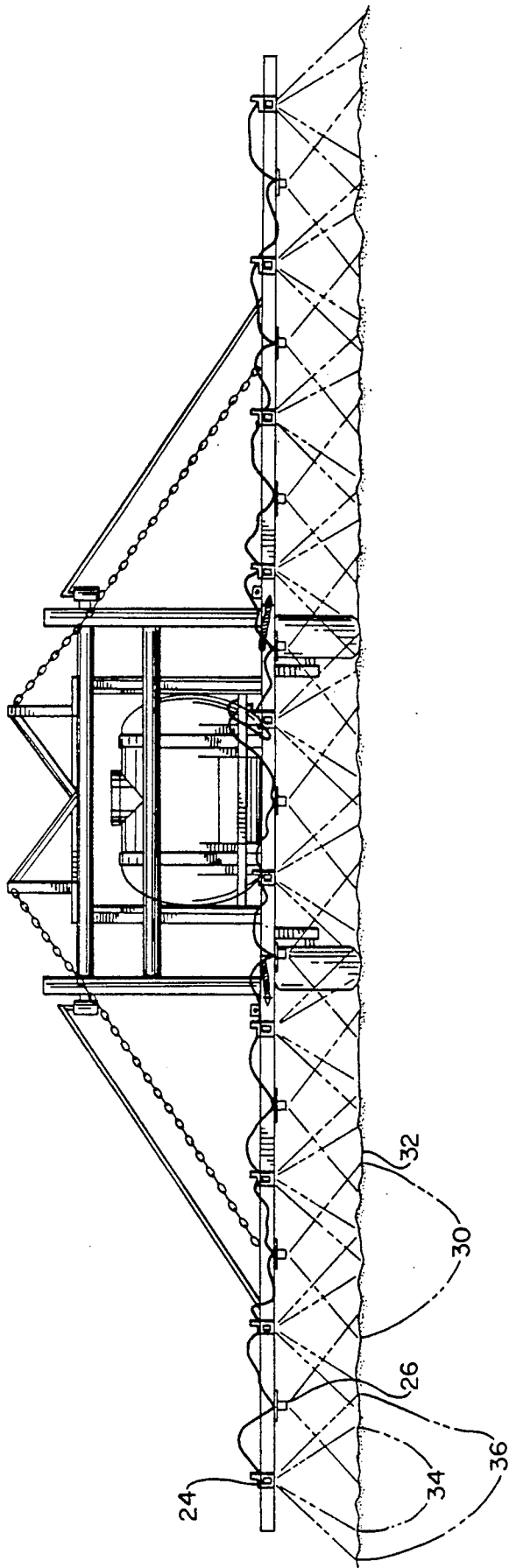
FIG. 3 is a rear elevational view of the invention.

Referring now to FIG. 3, a rear view of the field crop sprayer assembly is shown demonstrating the overlap of the various nozzles. The main boom nozzles 24 have a 80° spray pattern, shown by the solid lines 30, while the dotted lines 32 show a wider angle flat fan nozzle tip. The trailing boom nozzles 26 have a 120° spray pattern, shown by the solid lines 34, while the dotted lines 36 show a wider angle spray pattern.

This completes the description of the preferred and alternate embodiments of the invention. Those skilled in the art may recognize other equivalents to the specific embodiment described herein which equivalents are intended to be encompassed by the claims attached hereto.

What is claimed is:

1. A field crop sprayer assembly comprising:
 a main boom carrying a plurality of flat fan tip nozzles arranged for downward spraying, each nozzle tip being a predetermined distance apart on the main boom, and
 a trailing boom carrying a plurality of round tip nozzles arranged for downward spraying, each nozzle being a predetermined distance apart on the trailing boom, the trailing boom being spaced a predetermined distance behind the main boom.

2. The field crop sprayer assembly of claim 1 wherein the flat fan tip nozzles are spaced approximately 30 inches apart.

3. The field crop sprayer assembly of claim 1 wherein the round tip nozzles are spaced approximately 40 inches apart.

4. The field crop sprayer assembly of claim 1 wherein the trailing boom is spaced approximately 2 feet behind the main boom.

5. A field crop sprayer assembly comprising:
 a main boom;
 a trailing boom comprised of a plurality of elongated nozzle supports attached perpendicularly to the main boom, each nozzle support having a main boom connection end and a nozzle support end and each being connected a predetermined distance apart on the main boom;
 a plurality of flat fan tip nozzles connected to the main boom and arranged for downward spraying, each nozzle tip being connected a predetermined distance apart on the main boom; and
 a plurality of round tip nozzles, each nozzle tip being connected to the nozzle support end of a nozzle support and arranged for downward spraying.

6. The field crop sprayer assembly of claim 5 wherein the flat fan tip nozzles are spaced approximately 30 inches apart.

7. The field crop sprayer assembly of claim 6 wherein the round tip nozzles are spaced approximately 40 inches apart.

8. The field crop sprayer assembly of claim 5 wherein the trailing boom is spaced approximately 2 feet behind the main boom.

* * * * *